US012682038B1

(12) United States Patent
Shaked et al.

(10) Patent No.: US 12,682,038 B1
(45) Date of Patent: Jul. 14, 2026

(54) WEAK PASSWORD DETECTION IN CLOUD COMPUTING ENVIRONMENTS

(71) Applicant: Wiz, Inc., Palo Alto, CA (US)

(72) Inventors: Yaniv Shaked, Tel Aviv (IL); Gal Kozoshnik, Petach Tikva (IL)

(73) Assignee: Wiz, Inc., New York, NY (US)

( * ) Notice: Subject to any disclaimer, the term of this patent is extended or adjusted under 35 U.S.C. 154(b) by 210 days.

(21) Appl. No.: 17/807,803

(22) Filed: Jun. 20, 2022

Related U.S. Application Data

(60) Provisional application No. 63/212,975, filed on Jun. 21, 2021.

(51) Int. Cl.
*G06F 21/46* (2013.01)
*H04L 9/32* (2006.01)

(52) U.S. Cl.
CPC ............ *G06F 21/46* (2013.01); *H04L 9/3239* (2013.01)

(58) Field of Classification Search
CPC ............................... G06F 21/46; H04L 9/3239
See application file for complete search history.

(56) References Cited

U.S. PATENT DOCUMENTS

| | | | |
|---|---|---|---|
| 8,266,682 B2 | 9/2012 | Lee | |
| 8,769,637 B2 * | 7/2014 | Janzen | G06F 21/31 |
| | | | 713/168 |

| | | | |
|---|---|---|---|
| 9,722,997 B2 | 8/2017 | Zhang | |
| 2005/0198537 A1 * | 9/2005 | Rojewski | H04L 9/3226 |
| | | | 726/19 |
| 2011/0126272 A1 * | 5/2011 | Betzler | G06F 21/41 |
| | | | 726/6 |
| 2011/0296509 A1 * | 12/2011 | Todorov | H04L 63/083 |
| | | | 726/7 |
| 2021/0303673 A1 | 9/2021 | Kras | |

FOREIGN PATENT DOCUMENTS

| | | | | | |
|---|---|---|---|---|---|
| CN | 106411531 A | * | 2/2017 | | |
| CN | 107347078 A | * | 11/2017 | ............ | G06F 21/46 |
| CN | 108737094 B | * | 12/2021 | ............ | H04L 63/06 |
| EP | 1055990 A1 | * | 11/2000 | ........... | G06F 21/552 |

* cited by examiner

*Primary Examiner* — Bassam A Noaman
(74) *Attorney, Agent, or Firm* — M&B IP Analysts, LLC

(57) ABSTRACT

A system and method detect weak passwords in a workload deployed in a cloud computing environment. The method includes extracting a digest value from a password record, the password record further including a cryptographic function identifier of a cryptographic function; generating a digest value by processing the cryptographic function with a value selected from a dictionary list as an input; comparing the generated digest value to the extracted digest value; determining that a password associated with the password record is weak in response to the generated digest value matching the extracted digest value.

19 Claims, 4 Drawing Sheets

VIRTUAL MACHINE — 230

APP — 236

APP

BIN/LIB — 234

OS — 232

PASSWORD RECORD — 254

CERTIFICATE — 252

HYPERVISOR — 220

HARDWARE — 210

VIRTUAL MACHINE

APP

BIN/LIB

OS

200

WEAK PASSWORD DETECTION IN CLOUD COMPUTING ENVIRONMENTS

CROSS-REFERENCE TO RELATED APPLICATIONS

This application claims the benefit of U.S. Provisional Application No. 63/212,975 filed on Jun. 21, 2021, the contents of which are hereby incorporated by reference.

TECHNICAL FIELD

The present disclosure relates generally to cybersecurity and, in particular, to techniques for weak password detection in virtual workloads of a cloud computing environment.

BACKGROUND

One of the most prominent ways in which attackers gain access to computer systems is by obtaining unauthorized access from an authorized user. For example, successfully obtaining a password for an administrator account of a cloud computing environment allows an attacker to access the cloud computing environment, access sensitive data stored therein, and otherwise use resources of the cloud computing environment for the attacker's own intent. Such unauthorized access can result in millions of dollars of damage, which may sometimes be irreparable.

For example, when a feature film stored in digital format is accessed by an unauthorized user and distributed over the Internet, the owner has little recourse. Once a move is viewed by the public, they are disincentivized from attending a theater showing. Similarly, an attacker may access credit card numbers, social security numbers, and the like, which allows the attacker to illicitly gain access to funds.

These dangers, while not at all theoretical, are not always enough to encourage users to adopt stronger passwords. While some solutions attempt to require users to set passwords which include a certain combination of numbers, letters, and special characters (such as exclamation mark, question mark, etc.) in practice these are not always enforced, and often a user will set a password which meets the bare minimum of such requirements.

Weak passwords are, in this context, passwords which can be readily guessed by an attacker. Typically, an attacker will not actually guess passwords, as a human operator sitting in front of a computer and guessing password combinations one at a time would be inefficient and impractical. Instead, techniques such as brute forcing are used, where a computer is configured to use a dictionary of, for example, common alphanumeric combinations, in an attempt to gain access to a user account, administrator account, and the like.

A weak password is therefore one where the time required to pseudo-randomly guess the password is within some given timeframe. While there is no one agreed upon timeframe to define a weak password, it is generally accepted that a password which can be guessed (or cracked) within a timeframe where the data it is protecting is still sensitive, is a weak one. For example, a password which can be guessed within a few hours may be considered weak for a certain application, while a password that can be guessed within a few years is considered strong for that same application. Similarly, the password which can be guessed within a few hours may be considered acceptable if, for example, passwords are changed every hour. Another example of a weak password may be one that could be difficult to randomly guess, but in practice has widespread use, thereby making it a more likely candidate than a simple random guess would otherwise suggest.

In practice, organizations have limited ability, by design, to ascertain if a user's password is strong or weak. While it would certainly be beneficial to possess such knowledge, this would require at least two users, i.e., the intended user of the password and at least another user, to have knowledge of the password, thereby reducing the level of security which comes with having one password for one user.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting weak passwords in a workload deployed in a cloud computing environment. The method comprises: extracting a digest value from a password record, the password record further includes a cryptographic function identifier of a cryptographic function; generating a digest value by processing the cryptographic function with a value selected from a dictionary list as an input; comparing the generated digest value to the extracted digest value; determining that a password associated with the password record is weak in response to the generated digest value matching the extracted digest value; generating another digest value by processing the cryptographic function with another value selected from the dictionary list as an input, in response to the generated digest value not matching the extracted digest value, wherein the dictionary list includes another value; and determining that the password associated with the password record is not weak in response to the generated digest value not matching the extracted digest value, and wherein the dictionary list does not include another value.

Certain embodiments disclosed herein also include a non-transitory computer readable medium having stored thereon causing a processing circuitry to execute a process, the process comprising: extracting a digest value from a password record, the password record further includes a cryptographic function identifier of a cryptographic function; generating a digest value by processing the cryptographic function with a value selected from a dictionary list as an input; comparing the generated digest value to the extracted digest value; determining that a password associated with the password record is weak in response to the generated digest value matching the extracted digest value; generating another digest value by processing the cryptographic function with another value selected from the dictionary list as an input, in response to the generated digest value not matching the extracted digest value, wherein the dictionary list includes another value; and determining that the password associated with the password record is not weak in response to the generated digest value not matching the extracted digest value, and wherein the dictionary list does not include another value.

Certain embodiments disclosed herein also include a system for detecting weak passwords in a workload deployed in a cloud computing environment. The system comprises: a processing circuitry; and a memory, the memory containing instructions that, when executed by the processing circuitry, configure the system to: extract a digest value from a password record, the password record further includes a cryptographic function identifier of a cryptographic function; generate a digest value by processing the cryptographic function with a value selected from a dictionary list as an input; compare the generated digest value to the extracted digest value; determine that a password associated with the password record is weak in response to the generated digest value matching the extracted digest value; generate another digest value by processing the cryptographic function with another value selected from the dictionary list as an input, in response to the generated digest value not matching the extracted digest value, wherein the dictionary list includes another value; and determine that the password associated with the password record is not weak in response to the generated digest value not matching the extracted digest value, and wherein the dictionary list does not include another value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
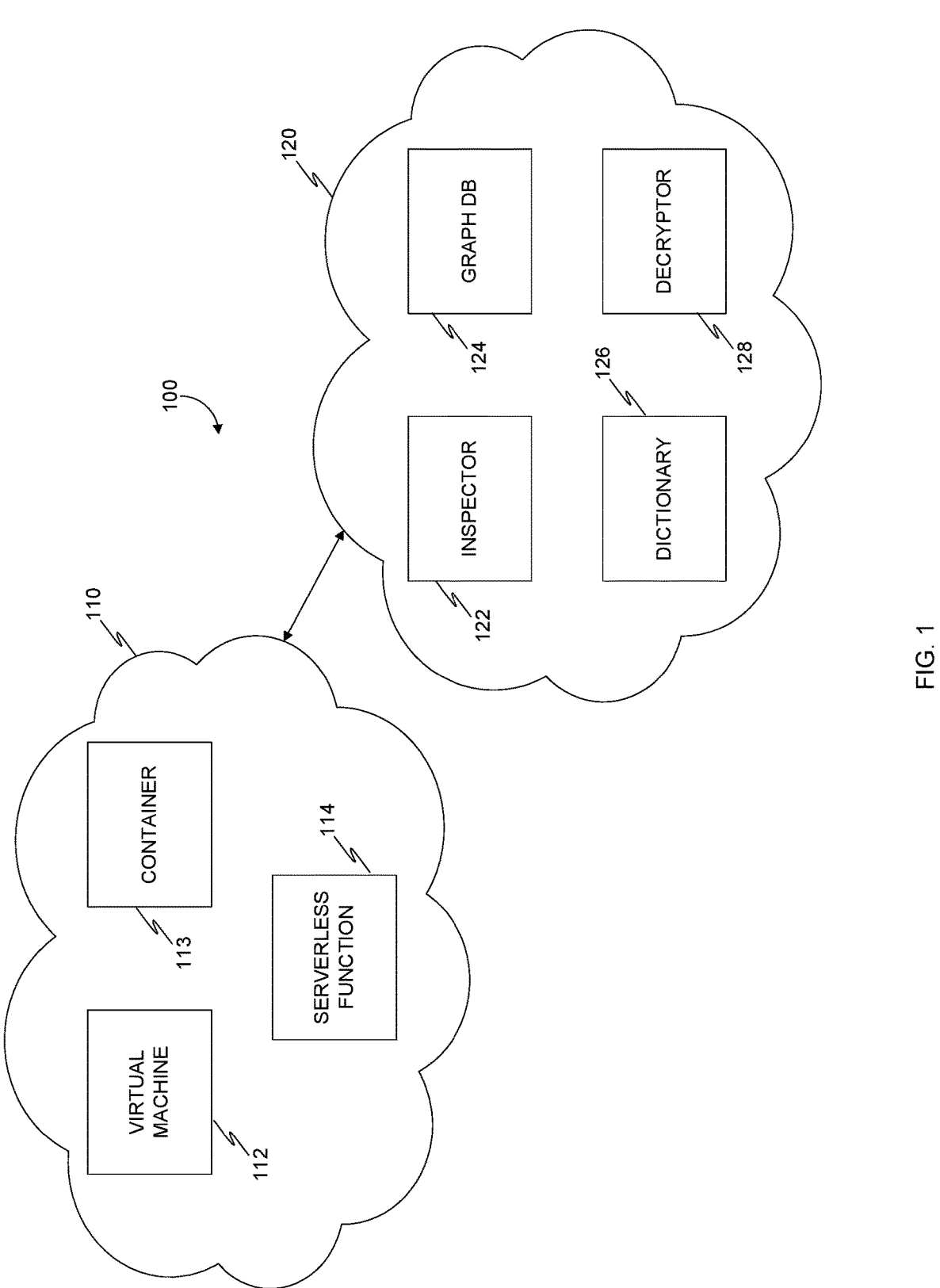
FIG. 1 is a schematic illustration of a cloud computing environment utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting weak passwords in a cloud computing environment. In an embodiment, a password is stored as a digest, which is a result of applying a hash function to the password, and in some embodiments applying the hash function to the password and a salt value. A salt value is a group of random bits, and by providing multiple salt values, a hash table attack can be mitigated somewhat, as each password needs to be hashed for each salt value, thereby lengthening significantly the time required to brute force a password.

According to some example embodiments, virtual workloads of a cloud computing environment are scanned or inspected for stored password records. Each detected password record includes a digest, hash function identifier and optionally a salt value, all of which may be extracted. A decryptor system attempts to perform a brute force attack to guess the password of the password record, by generating a plurality of digests based on the hash function, the salt value, and a dictionary of values. When a match occurs between a generated digest and an extracted digest, the password of the extracted digest becomes known with a high degree of certainty, thus providing a detection of a potential security risk, as the password is vulnerable to a brute force attack.

As noted, an attacker may perform a brute force attack, dictionary attack, and the like random or pseudo-random cryptanalytic attack techniques. However, such attacks are computationally expensive, meaning they require significant processing resources, rendering them often inefficient, especially if performed regularly (e.g., as part of a weekly, monthly, etc. security checkup). Furthermore, a human guessing passwords is not able to input passwords with a level of consistency. Human operators often fail to remember if they already tried a certain combination, especially when the combination is a random alphanumeric string which has no meaning attached to it (as opposed, for example, to a language word). When multiplied over different combinations, the need to manually type in each password, and keep an exact record of every attempt tried and every attempt there is still to try, the task becomes impossible for a human to succeed.

The present disclosure provides a solution which is reliable, and consistently applies different guesses until either the candidates are exhausted, or a password is successfully guessed. Furthermore, by inspecting a workload and determining the hash function and salt value, the number of password candidates which need to be computed are reduced, thereby resulting in a reduction of processing and memory usage.

FIG. 1 is an example schematic illustration of a cloud computing environment 100 utilized to describe the various disclosed embodiments. A first cloud computing environment 110 includes a plurality of resources. A resource may be, but is not limited to, a virtual machine 112, a software container 113, and a serverless function 114. The cloud computing environment may be implemented as a virtual private cloud (VPC) on a cloud computing infrastructure, such as, Amazon® Web Services (AWS), Microsoft® Azure, Google® Cloud Platform, and the like. Each resource may use credentials to access or communicate with other resources, principals (e.g., user accounts, service accounts, and the like), other resources of the first cloud computing environment, or resources of another cloud computing environment. Resources and principals are cloud entities, where a principal is a cloud entity which can initiate actions within the cloud computing environment, and act on resources deployed therein.

Credentials may include, for example, a password used to authenticate the resource with another resource or principal. A password record may be stored, for example, on a disk associated with the resource, in an image of a container, and the like. Passwords are typically not stored as strings, but rather as a result, also known as a digest, of a hash function applied to the password. Some hash functions further receive another input, such as a random large number, known as a salt. A password record may include a digest, an identifier of a cryptographic hash function, and the random salt. An identifier of a cryptographic hash function may be, for example, SHA-1, SHA-2, SHA-3, BLAKE2, BLAKE3, and the like.

An inspection environment 120 is communicatively connected to the first cloud computing environment 110. In an embodiment, the first cloud computing environment 110 and the inspection environment 120 may be implemented as the same environment, different accounts in the same cloud computing environment, have different architectures, or be implemented as different environments in similar architectures. For example, the first cloud computing environment 110 may be implemented in Azure®, while the inspection environment 120 is implemented in AWS®.

The inspection environment 120 includes a plurality of inspectors, such as inspector 122. Each inspector 122 is operative for inspecting a resource for one or more objects. An object may be, for example, a certificate, a password, a file, a folder, a library, a binary, and the like. The inspection environment 120 further includes a graph database 124 for storing security graph, a dictionary database 126 for storing a dictionary, and a decryptor system 128. In an embodiment, the dictionary includes a plurality of strings, each string used by the decryptor 128 to generate a digest based on at least the string and a hash function. In some embodiments, a portion of the strings are alphanumeric strings.

In an example embodiment, a risk graph includes a representation of the first cloud computing environment 110. For example, the risk graph may include a first plurality of nodes connected by edges, each node representing a resource or principal of the cloud computing environment 110. An edge may represent a communication interface between two nodes. For example, a first resource communicating over a network protocol with a second resource may be indicated by connecting a node representing the first resource with a node representing the second resource, by an edge representing the type of network interface connection (such as one or more ports).

A dictionary database 126 may include a dictionary used for brute force password attacks. A brute force password attack refers to a cybersecurity attack on a resource or principal, where the attacker attempts to provide different passwords, guessing the correct one and then exploiting the resource once the correct password is guessed. A dictionary may include a list of strings (e.g., wordlist), a list of digests, or a combination thereof. For example, the dictionary database 126 may include a table, where a first column is a list of strings, and a second column is a list of digests corresponding to each string in the first column and generated based on a first cryptographic hash function. In certain embodiments, a plurality of second columns may be realized, each second column corresponding to a different hash function with a same salt, or to the same hash function with a different salt.

The decryptor 128 may be realized as a physical machine or virtual workload. When realized as a virtual workload, the decryptor 128 is executed over a physical machine, an example of which is provided in FIG. 4. In an embodiment, a decryptor 128 is configured to receive a password record and initiate a brute force attack on the password, to determine if the password is weak (i.e., is susceptible to a brute force attack) or not. The decryptor 128 may generate digests based on cryptographic hash functions and compare the digests to a digest read from a password record. If the decryptor 128 is successful in matching the received digest to a generated digest, the password is considered weak since it is vulnerable to a brute force attack. An example of a method implemented by the decryptor 128 is detailed below.

Figure 2:
FIG. 2 is a schematic illustration of a virtual machine implemented in a cloud computing environment utilized to describe an embodiment.

FIG. 2 is an example of a schematic illustration of a virtual machine implemented in a cloud computing environment, utilized to describe an embodiment. While this example shows a virtual machine, it should be readily apparent that the teachings equally apply to other virtual workloads, such as software containers and serverless functions.

A virtual machine (VM) 200 is implemented on top of a hardware layer (also known as bare metal) 210. In an embodiment, the hardware layer 210 includes physical devices (hardware resources) such as any one of: a storage device, a memory device, a processor, a network interface card (NIC), and the like. The hardware layer is provisioned by a hypervisor 220 to allow various virtualizations access to the hardware resources as needed. For example, the hypervisor 220 provisions hardware resources from the hardware layer 210 in order to run a plurality of virtual machines, such as VM 230.

The VM 230 includes a guest operating system (OS) 232, such as Microsoft® Windows, Linux, and the like. The OS 232 has installed thereon binary and library files 234. Binaries and libraries are software components used by other applications, such as application 236, in order to execute. An application may be, for example, a load balancer, a web server, a reverse proxy, a proxy, and the like.

The OS 232 of the VM 230 may include a file system, which allows storing of files and folders. The OS 232 may further store secrets, such as a password record 254, a certificate 252, and the like. A password record may include a digest (result of a hash function applied to a password), an identifier of a hash function, and a salt. A certificate may include, for example, information pertaining to a cryptographic key, information pertaining to the owner of the cryptographic key, and a digital signature by a certificate authority (i.e., certificate issuer).

An inspector, such as the inspector 122 of FIG. 1 may access the VM 230 and inspect the contents of the VM 230 to detect secrets, such as the password record 254, certificate 252, and the like. In an embodiment, a snapshot is generated based on the VM 230, which is based off of the OS 232, binary and library files 234, and application 236. The snapshot may be inspected, for example by mounting the snapshot as a volume and inspecting the volume. Detected secrets may be provided to a decryptor for determining if a password of the detected secrets is a weak password.

Figure 3:
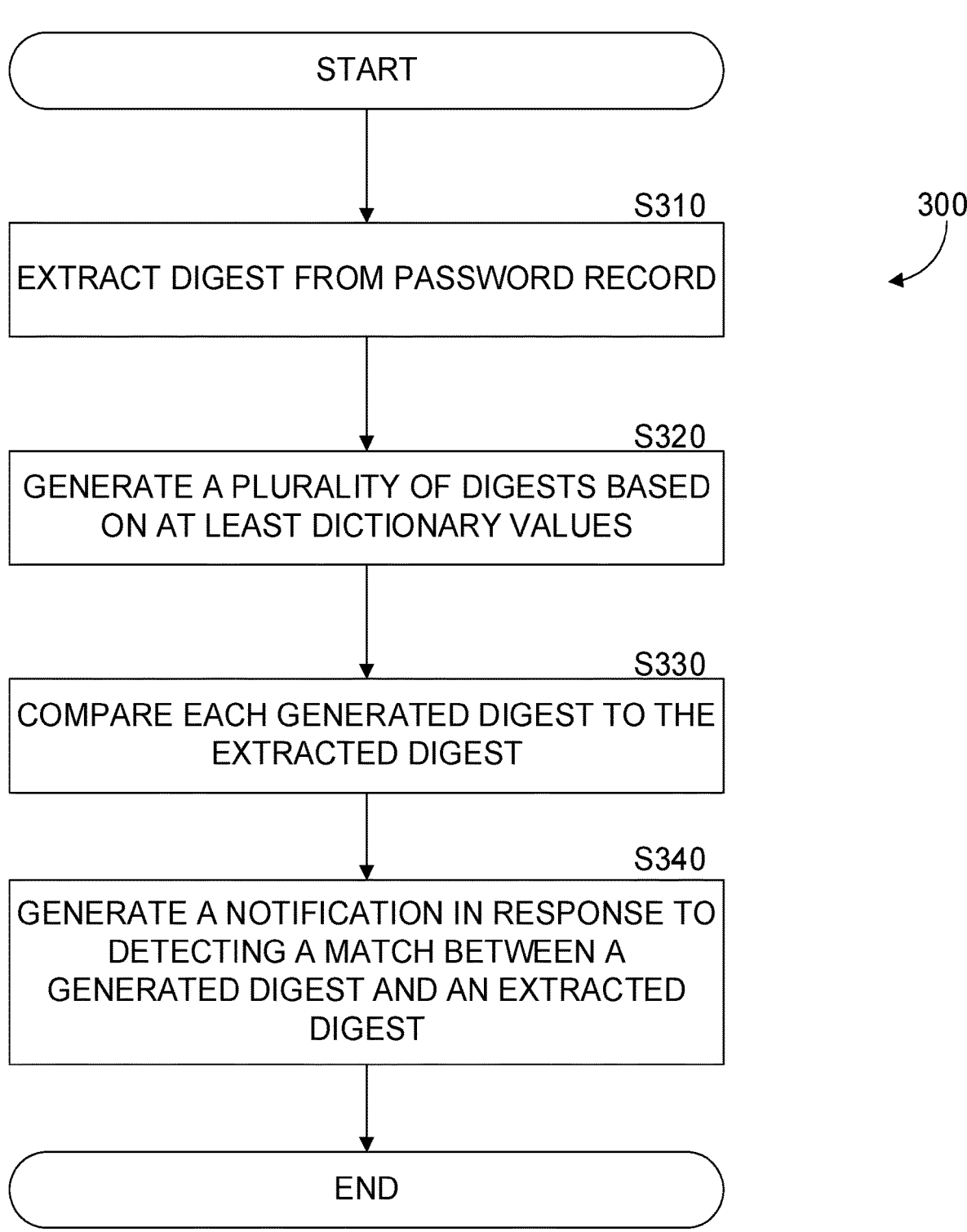
FIG. 3 is a flowchart of a method for detecting weak passwords in virtual workloads of a cloud computing environment, implemented in accordance with an embodiment.

FIG. 3 is an example flowchart 300 of a method for detecting weak passwords in virtual workloads of a cloud computing environment, implemented in accordance with an embodiment. In an embodiment, the method performs a form of dictionary based brute force attack, by generating a pool of candidate digests to compare to a digest extracted from a password record. The method is more efficient than a brute force method or a dictionary based brute force method, as the pool of candidates is reduced by further extracting from the password record a salt value, and a hash function identifier.

At S310, a digest is extracted from a password record. A digest is a result of a hash function applied to a password. In some embodiments the digest is a result of a hash function applied to a password and a salt. In certain embodiments, a hash function identifier is further extracted from the password record. In some embodiments a salt value is also extracted from the password record. In an embodiment, extracting the digest includes inspecting a resource, such as a VM, container, or serverless function, for a password record (or other secret record). A secret record may be a password record, a certificate, and the like. The password record is accessed to detect the digest, and the digest may be copied from the password record to, for example, a temporary storage of a decryptor system.

At S320, a plurality of digests are generated. Each generated digest is based on a value, such as a string, from a dictionary obtained from the dictionary database. A dictionary includes a plurality of password candidates, stored for example as a list of strings. In certain embodiments, each digest is further generated based on the extracted hash function identifier, the extracted salt value, or a combination of both. For example, if the extracted hash function identifier corresponds to SHA-1 with a specific salt value, a plurality of digests are generated based on processing the SHA-1 algorithm for each value from the dictionary, combined with the specific salt value, to generate a corresponding digest. Optionally, each generated digest may be stored in a database, such that each value in a first column corresponds to a value from the dictionary, and at least a second column where for each dictionary value there is a corresponding digest generated based on providing to a hash function at least the dictionary value.

At S330, the extracted digest value is compared to each generated digest value to determine a match. In certain embodiments, the extracted digest is compared to each generated digest as it is generated. By comparing each generated digest to the extracted digest when it is generated, if a match does occur there is no need to generate further digests, thus reducing processing resources usage.

When a match occurs between a generated digest value and the extracted digest value, the password corresponding to the extracted digest is successfully determined. The extracted digest is a result of applying a hash function to a password. By applying different passwords to the hash function, different digests are generated. When a generated digest matches the extracted digest, this is with high probability due to the input to the hash function matching for both the extracted digest and the generated digest. The probability is high, but not absolute, as hash functions are functions which reduce an infinite space of inputs to a finite space of outputs. It is therefore possible, though not probable, that two different passwords, when input each to a hash function, result in the same digest. However, it can be said with high certainty that when two digests match, they correspond to identical passwords, assuming the salt values and hash functions are known.

For example, a first password may be 'P@ssw0rd' with a salt of '0cebd', which results in a digest value of 'ht8mc0w' when applying an SHA-1 hash function. The password record for the first password stores '0cebd' as the salt, 'ht8mc0w' as the digest, and SHA-1 as the identifier of the hash function. A decryptor is configured to extract the salt value, and configure a processor to execute the SHA-1 hash function with a first input selected from a dictionary, and the salt value as the second input. Each input selected from the dictionary will result in a different digest. For example, when providing as input 'p@ssword' with the salt value '0cebd', the digest value may be 'kd9mcjh', which does not match the extracted digest. When the hash function is provided with 'P@ssw0rd' as an input together with the salt value '0cebd', the output digest will be 'ht8mc0w', which matches the extracted digest, therefore the password is 'P@ssw0rd'.

At S340, a notification is generated to alert a user of a weak password has been found in a workload of the cloud computing environment. The alert may be sent or display on a dashboard of a user monitoring the cloud computing environment. In some embodiments, an alert may further be associated with a severity level (e.g., moderate, severe, critical, and the like) and a mitigation action may be associated with the determined severity level. For example, a security graph may be traversed to determine what effect the weak password may potentially have, in terms of compromise of the cloud computing environment. For example, if a weak password is detected on a workload which is not connected to other workloads, the severity level may be determined as moderate. However, a load balancer having a weak password may be determined to be a critical threat level if the load balancer provides connectivity to the Internet or other public network.

Where a match is not successful between the generated digests and the extracted digest, the password is determined to be not weak. In an embodiment, a list may be generated of resource identifiers which include weak passwords. In some embodiments, another list may be generated of resource identifiers which include passwords which are not weak.

Figure 4:
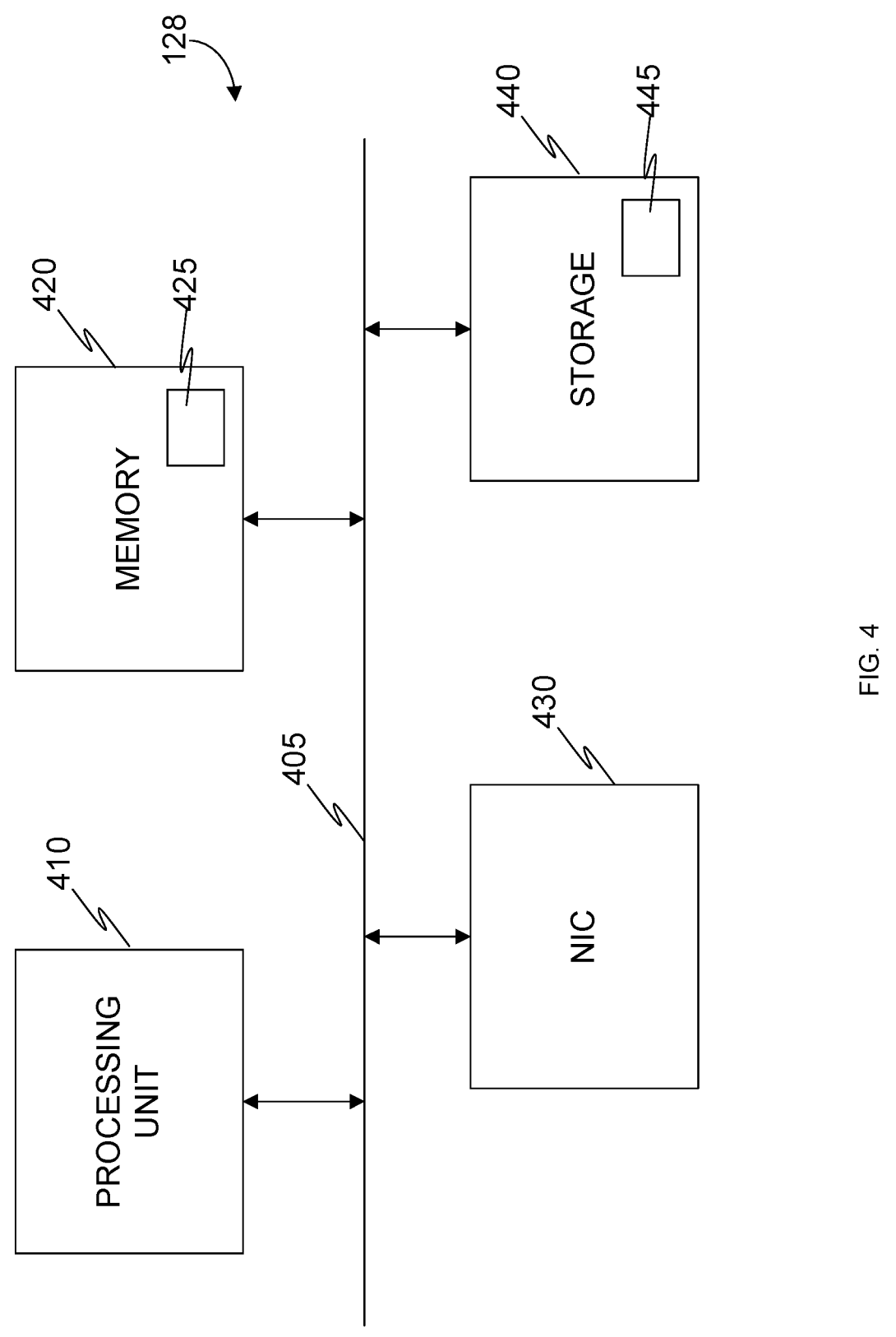
FIG. 4 is a schematic illustration of a decryptor system implemented according to an embodiment.

FIG. 4 is an example of a schematic illustration of a decryptor system 128 implemented according to an embodiment. The decryptor system 128 may be implemented as a physical machine, or in other embodiments, a virtual workload, such as a virtual machine or container. When implemented as a virtual workload, the virtual workload may in turn be deployed on a physical machine such as described below. The decryptor 128 includes at least one processing element 410, for example, a central processing unit (CPU). In an embodiment, the processing element 410 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In certain embodiments it may be advantageous for the at least one processing element 410 to further include one or more general purpose graphic processor units (GPGPUs). For example, for comparing and generating digests, a GPGPU may have improved performance over a CPU.

The processing element 410 is coupled via a bus 405 to a memory 420. The memory 420 may include a memory portion 425 that contains instructions that when executed by the processing element 410 performs the method described in more detail herein. The memory 420 may be further used as a working scratch pad for the processing element 410, a temporary storage, and others, as the case may be. The memory 420 may be a volatile memory such as, but not limited to random access memory (RAM), or non-volatile memory (NVM), such as, but not limited to, Flash memory. The memory may further be used to store one or more generated digests.

The processing element 410 may be coupled to a network interface controller (NIC) 430, which provides connectivity to one or more cloud computing environments, such as the first cloud computing environment and second cloud computing environments of FIG. 1, via a network.

The processing element 410 may be further coupled with a storage 440. Storage 440 may be used for the purpose of holding a copy of the method executed in accordance with the disclosed technique. The storage 440 may include a storage portion 445 containing a generated digests, extracted digests, one or more cryptographic hash functions, one or more salt values, etc.

The processing element 410 and/or the memory 420 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting weak passwords in a workload deployed in a cloud computing environment, comprising:
   extracting a first digest value from a password record, the password record stored in the workload deployed in the cloud computing environment, wherein the password record further includes a cryptographic function identifier of a cryptographic function;
   extracting the cryptographic function identifier from the password record;
   selecting the cryptographic function from a plurality of cryptographic functions based on the extracted cryptographic function identifier;
   generating a second digest value by processing the selected cryptographic function with a value selected from a dictionary list as an input;
   comparing the generated second digest value to the extracted first digest value;
   determining that a password associated with the password record is weak in response to the generated second digest value matching the extracted first digest value;
   generating another digest value by processing the selected cryptographic function with a second value selected from the dictionary list as an input, in response to the generated second digest value not matching the extracted first digest value, wherein the dictionary list includes another value; and
   determining that the password associated with the password record is not weak in response to the generated another digest value not matching the extracted first digest value, and wherein the dictionary list does not include another value.

2. The method of claim 1, further comprising:
   generating the second digest value by processing the cryptographic function further with a salt value, wherein the password record further includes the salt value.

3. The method of claim 1, wherein the cryptographic function is a hash function.

4. The method of claim 3, wherein the hash function is any one of: secure hash algorithm (SHA) 1 (SHA-1), SHA-2, SHA-3, BLAKE2, and BLAKE3.

5. The method of claim 1, further comprising:
   inspecting the workload to detect the password record.

6. The method of claim 1, wherein the workload is any one of: a virtual machine, a container, and a serverless function.

7. The method of claim 1, wherein the dictionary list includes a plurality of alphanumeric values.

8. The method of claim 1, further comprising: storing the extracted first digest value in a temporary memory.

9. The method of claim 1, further comprising:
   generating an alert to indicate that a weak password is detected, in response to the generated second digest value matching the extracted first digest value.

10. A non-transitory computer readable medium having stored thereon instructions for causing a processing circuitry to execute a process for detecting weak passwords in a workload deployed in a cloud computing environment, the process comprising:

extracting a first digest value from a password record, the password record stored in the workload deployed in the cloud computing environment, wherein the password record further includes a cryptographic function identifier of a cryptographic function;

extracting the cryptographic function identifier from the password record;

selecting the cryptographic function from a plurality of cryptographic functions based on the extracted cryptographic function identifier;

generating a second digest value by processing the selected cryptographic function with a value selected from a dictionary list as an input;

comparing the generated second digest value to the extracted first digest value;

determining that a password associated with the password record is weak in response to the generated second digest value matching the extracted first digest value;

generating another digest value by processing the selected cryptographic function with a second value selected from the dictionary list as an input, in response to the generated second digest value not matching the extracted first digest value, wherein the dictionary list includes another value; and determining that the password associated with the password record is not weak in response to the generated another digest value not matching the extracted first digest value, and wherein the dictionary list does not include another value.

11. A system for detecting weak passwords in a workload deployed in a cloud computing environment, comprising:

a processing circuitry; and a memory, the memory containing instructions that, when executed by the processing circuitry, configure the system to:

extract a first digest value from a password record, the password record stored in the workload deployed in the cloud computing environment, wherein the password record further includes a cryptographic function identifier of a cryptographic function;

extract the cryptographic function identifier from the password record;

select the cryptographic function from a plurality of cryptographic functions based on the extracted cryptographic function identifier;

generate a second digest value by processing the selected cryptographic function with a value selected from a dictionary list as an input;

compare the generated second digest value to the extracted first digest value;

determine that a password associated with the password record is weak in response to the generated second digest value matching the extracted first digest value;

generate another digest value by processing the selected cryptographic function with a second value selected from the dictionary list as an input, in response to the generated second digest value not matching the extracted first digest value, wherein the dictionary list includes another value; and determine that the password associated with the password record is not weak in response to the generated another digest value not matching the extracted first digest value, and wherein the dictionary list does not include another value.

12. The system of claim 11, wherein the memory contains further instructions that, when executed by the processing circuitry, further configure the system to:

generate the second digest value by processing the cryptographic function further with a salt value, wherein the password record further includes the salt value.

13. The system of claim 11, wherein the cryptographic function is a hash function.

14. The system of claim 13, wherein the hash function is any one of: secure hash algorithm (SHA) 1 (SHA-1), SHA-2, SHA-3, BLAKE2, and BLAKE3.

15. The system of claim 11, wherein the memory contains further instructions that, when executed by the processing circuitry, further configure the system to:

inspect the workload to detect the password record.

16. The system of claim 11, wherein the workload is any one of: a virtual machine, a container, and a serverless function.

17. The system of claim 11, wherein the dictionary list includes a plurality of alphanumeric values.

18. The system of claim 11, wherein the memory contains further instructions that, when executed by the processing circuitry, further configure the system to:

store the extracted first digest value in a temporary memory.

19. The system of claim 11, wherein the memory contains further instructions that, when executed by the processing circuitry, further configure the system to:

generate an alert to indicate that a weak password is detected, in response to the generated second digest value matching the extracted digest value.

* * * * *